United States Patent [19]

Ohkubo

[11] Patent Number: 4,530,581
[45] Date of Patent: Jul. 23, 1985

[54] INFORMATION DISPLAY DEVICE FOR CAMERA

[75] Inventor: Yuji Ohkubo, Ohmiya, Japan

[73] Assignee: Nippon Kogaku K.K., Tokyo, Japan

[21] Appl. No.: 529,985

[22] Filed: Sep. 8, 1983

Related U.S. Application Data

[63] Continuation of Ser. No. 476,635, Mar. 18, 1983, abandoned, which is a continuation of Ser. No. 265,999, May 21, 1981, abandoned.

[30] Foreign Application Priority Data

Jun. 16, 1980 [JP] Japan ................................ 55-81030

[51] Int. Cl.³ ............................................ G03B 15/05
[52] U.S. Cl. .............................. 354/127.12; 354/127.1
[58] Field of Search ................. 354/418, 127.1, 127.11, 354/127.12, 289.1, 289.12

[56] References Cited

U.S. PATENT DOCUMENTS

| 4,152,055 | 5/1979 | Ohta et al. ..................... 354/127.12 |
| 4,176,933 | 12/1979 | Watanabe ....................... 354/127.12 |
| 4,193,677 | 3/1980 | Hasegawa et al. ................. 354/127 |
| 4,199,236 | 4/1980 | Goto et al. ................ 354/127.12 X |

Primary Examiner—William B. Perkey
Attorney, Agent, or Firm—Fitzpatrick, Cella, Harper & Scinto

[57] ABSTRACT

A camera is adapted to support a flash device capable of functioning in synchronism with camera exposure operation when electrically connected thereto and of generating electrical energy and to transmit same to the camera when the flash device is in condition to flash. A display device is operable in one mode by the generated electrical energy and apparatus is provided to set the exposure condition and includes a switch operable when that condition exceeds a predetermined value. Apparatus are operable by the generated energy through the switch to activate the display device in a second mode in response to the setting of the exposure condition.

3 Claims, 1 Drawing Figure

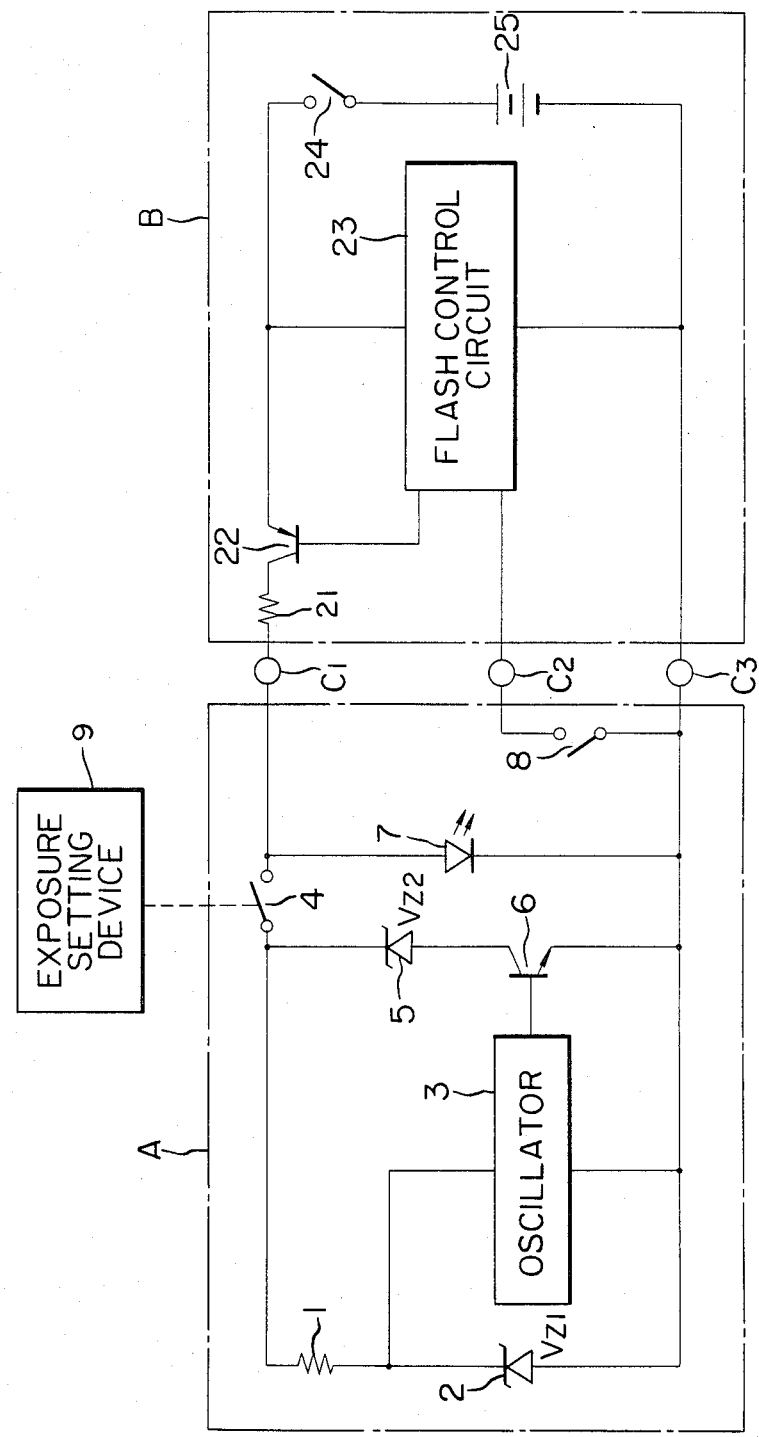

INFORMATION DISPLAY DEVICE FOR CAMERA

This application is a continuation of application Ser. No. 476,635 filed Mar. 18, 1983, now abandoned, which is a continuation of application Ser. No. 265,999 filed May 21, 1981, now abandoned.

BACKGROUND OF THE INVENTION

1. Field of the Invention

The present invention relates to a display device for use in a camera for displaying therein information from a flash device.

2. Description of the Prior Art

There is already known a camera having a display element such as a light-emitting diode and capable of indicating therein the charged or operable state of a flash device in response to a current supplied to said element from said flash device when the main capacitor thereof has been charged. Also the U.S. Pat. No. 4,176,933 discloses a display device in which an alarm is given by a different display mode of the display element in case the photographing conditions of the camera are inadequate for flash photographing, for example if the shutter speed is not synchronizable with the light from the flash device or if the diaphragm aperture is inadequately selected. However, since such change of display mode is achieved by the battery in the camera, the above-mentioned alarm display cannot be given if the battery in the camera is exhausted or if the camera is not loaded with the battery.

SUMMARY OF THE INVENTION

The object of the present invention is to provide a camera with a display device not associated with the aforementioned drawbacks and capable of controlling the display element according to the selected photographing conditions of the camera and in response to the signal from the flash device, without requiring power supply from the battery in the camera.

BRIEF DESCRIPTION OF THE DRAWING

The attached drawing is a circuit diagram showing an embodiment of the present invention.

DESCRIPTION OF THE PREFERRED EMBODIMENT

In the drawing there is shown an embodiment of the camera having a display device of the present invention, having a camera circuit A and a flash circuit B.

The flash circuit B comprises a power source 25, a power switch 24, a flash control circuit 23, a charge completion signal generating transistor 22 and a resistor 21 therefor. The flash control circuit 23 performs a function of releasing a flash in response to the closing of a contact 8 in the camera circuit A and a function of detecting the charged state of a main capacitor in the flash control circuit and rendering the transistor 22 conductive to transmit a charge completion signal to the camera through the resistor 21 and a connector C1 when the main capacitor is charged ready for giving a flash. The contact 8 is closed in synchronization with the shutter release of the camera to provide a flash when the exposure aperture is opened.

The camera circuit A constitutes a display control circuit for the charge completion signal, comprising a switch 4 operatively associated with an exposure setting device 9 for determining the shutter speed, a light-emitting diode 7 for indicating the completion of charging, a resistor 1, Zener diodes 2, 5, an oscillator 3 and a transistor 6.

The switch 4 is so controlled according to the shutter speed as to be open at shutter speeds synchronizable with the flash device, for example 1/125 sec. or longer, and to be closed at other unsynchronizable shutter speeds.

When the switch 4 is open, upon completion of the charging of the main capacitor, the transistor 22 is activated to transmit the charge completion signal from the power source 25 through the connector C1 to the light-emitting diode 7 thereby indicating the operable state of the flash device. When the switch 4 is closed, the charge completion signal from the power source 25 is also supplied to the resistor 1 to generate a voltage $V_{Z1}$ across the Zener diode 2.

The oscillator 3 is activated by the voltage to periodically turn on and off the transistor 6. The Zener diode 5 and the transistor 6 are so selected that the sum of the Zener voltage $V_{Z2}$ and the collector-emitter voltage $V_{CE}$ of the transistor 6 is smaller than the forward voltage of the light-emitting diode 7. Consequently the light-emitting diode 7 is turned off or on respectively when the transistor 6 is on or off. In this manner the light-emitting diode 7 is intermittently energized, thus giving a warning that the shutter speed selected by the exposure setting device 9 is not synchronizable with the flash from the flash device. Now let us give further consideration to the relation between the voltages $V_{Z1}$, $V_{Z2}$ of the Zener diodes 2, 5 and the forward voltage $V_F$ of the light-emitting diode 7. As $V_F$ is generally in the order of 1.5–2 Volts, $V_{Z2}+V_{CE}$ should be maintained in the order of 1.3 volt in order to extinguish the light-emitting diode. Also the oscillator 3, being powered by the Zener voltage $V_{Z1}$ of the Zener diode 2, should preferably be supplied with a constant voltage even during the intermittent function of the light-emitting diode 7. Consequently the Zener voltage $V_{Z1}$ is selected lower than $V_{Z2}+V_{CE}$, for example in the order of 1.1 volt. Since the Zener diode of such low voltage is usually not available, stacked diodes can be utilized for this purpose for obtaining added forward voltages thereof. Thus the Zener diode 2 or 5 can be replaced by two stacked diodes. Also, since the function of the Zener diode 2 is to supply a constant voltage to the oscillator 3, that diode 2 and the resistor 1 can be dispensed with if the oscillator 3 is of a type capable of normal function regardless of slight variation in the supply voltage, in which case the power supply terminal of the oscillator 3 can be directly connected to the cathode of the Zener diode 5. Furthermore the charge completion signal in the present embodiment is supplied as a current signal determined by the power source 25 and the resistor 21, but it is also possible to transmit said signal in a constant current form or in a voltage form.

The foregoing embodiment may be subjected to variations as will be explained in the following.

The switch 4 in the foregoing embodiment is associated with the selected shutter speed to transmit the charge completion signal from the power source 25 to the oscillator 3 when the selected shutter speed is not suitable for photographing with flash, but the switch 4 may also be associated with other photographing conditions.

Also, the display element 7 in the camera is not limited to a light-emitting diode but may be composed of other optical or acoustic display elements.

Furthermore, the display element is not limited for indicating the charge completion of the flash device but can be for any purpose as long as it is controlled by a signal from the flash device. For example, the flash control circuit may be provided with a circuit for controlling the amount of flash according to the state of the object and releasing a flash output control signal upon completion of said control function, and the display element can be utilized for confirming the automatic flash output control function in response to said signal.

I claim:

1. A camera capable of a flash photography in cooperation with a flash device in accordance with an exposure time set in a range suitable to a flash light emission, said flash device generating electric energy at an electric terminal which is connected to an electric contact of the camera in a state where the flash device can emit flashlight, said camera comprising:
   (a) a display element connected to said electric contact, the display element being energized when a voltage higher than a first level is applied to the display element by said electric energy;
   (b) control circuit means connected across said display element to control the voltage applied to said display element; and
   (c) said control circuit means including oscillator means, a first constant voltage circuit for generating a voltage of a second level which is lower than said first level, by said electric energy in response to said oscillator means, switch means operable into reverse states in dependence upon whether the set exposure time is within or out of said range, the switch means being closed to connect said first constant voltage circuit across said display element, and a drive circuit which, when said switch means is closed, is connected to said electric contact to energize said oscillator means by said electric energy.

2. A camera according to claim 1, wherein said drive circuit includes a voltage of a third level which is lower than said second level, and said oscillator means is energized by the voltage of said third level.

3. A camera according to claim 1, wherein said drive circuit has a series circuit of a resistor and a second constant voltage circuit, the series circuit being connected across said first constant voltage circuit, said second constant voltage circuit generates a voltage of a third level which is lower than said second level, and said oscillator means is energized by the voltage of said third level.

* * * * *